Oct. 18, 1932.     M. H. MARTIN     1,883,385
AUXILIARY SPRING MECHANISM FOR TRUCKS
Original Filed May 11, 1928
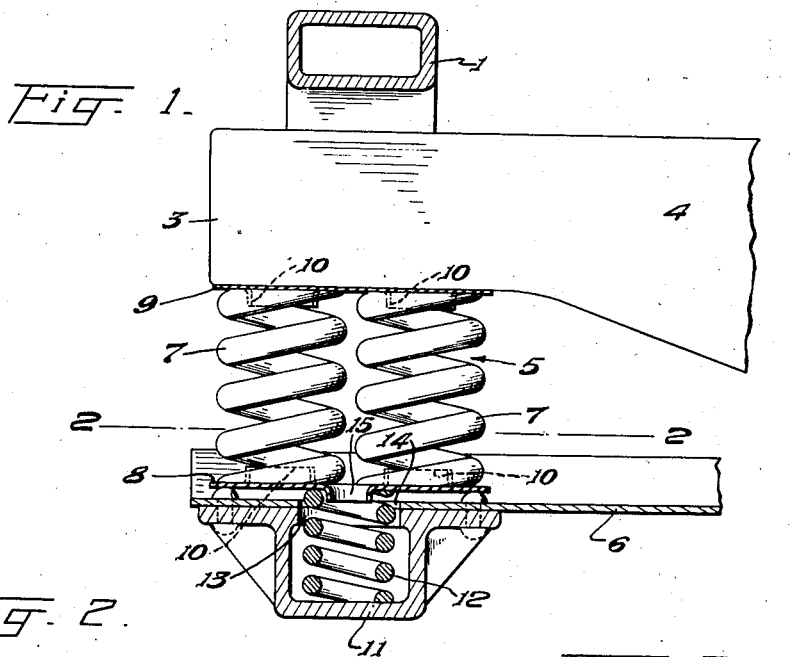
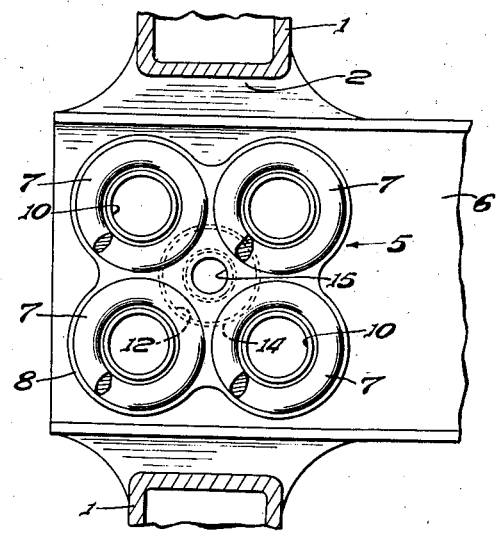
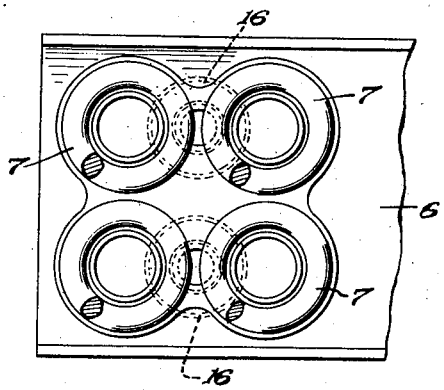
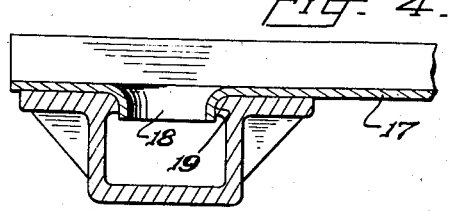
Inventor
MARK H. MARTIN
By
Attorney Patented Oct. 18, 1932

1,883,385

UNITED STATES PATENT OFFICE

MARK H. MARTIN, OF READING, PENNSYLVANIA, ASSIGNOR TO T. H. SYMINGTON & SON, INC., OF BALTIMORE, MARYLAND, A CORPORATION OF MARYLAND

AUXILIARY SPRING MECHANISM FOR TRUCKS

Original application filed May 11, 1928, Serial No. 277,081. Divided and this application filed May 27, 1929. Serial No. 366,376.

The invention relates to railway trucks and has special reference to the spring means for supporting the load, the present application being a division of my co-pending application for patent for auxiliary spring mechanism for trucks, which application was filed May 11, 1928 and given Serial No. 277,081.

The principal object of the invention, generally stated, is to provide auxiliary spring means operating in series with the usual truck springs provided for supporting the bolster, the auxiliary springs acting not only to increase the general spring travel but also serving to maintain the side bearings of the truck and body bolsters in engagement at all times.

The invention is particularly designed for use in connection with installation or equipment of that type wherein the load is sustained either entirely, partly or occasionally by side bearings, the auxiliary spring means materially assisting in holding the light wheel or wheels in contact with the rail when the car is rocked violently as for example when entering upon or leaving curved track, the effect being really the equivalent of adding dead weight to the side of the truck upon which there is a tendency for the wheels to unload.

A more specific object of the invention is to provide auxiliary spring means of this character which may be located within the side frame beneath the spring plank and cooperating with the underside of the bottom spring cap and therefore acting in series with the usual springs.

A further object of the invention is the provision of spring means of this character so mounted and arranged as to be free from changing strains under normal load conditions and prevented from ever going solid with the resultant advantage that a long life will be assured.

An additional object of the invention is to provide a spring means of this character which will be simple and inexpensive to manufacture and install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a vertical cross section through one side of a truck, the bolster and spring nest being shown in elevation, Figure 2 is a cross sectional view taken on the line 2—2 of Figure 1, Figure 3 is a similar view omitting the side frame and illustrating the employment of a plurality of auxiliary springs, and Figure 4 is a fragmentary view through one end of the spring plank and a portion of the side frame and illustrating a modified spring plank structure.

Referring more particularly to the drawing the numeral 1 designates a truck side frame of any ordinary or preferred type having a window opening 2 therein through which extends the end portion 3 of the truck bolster 4, a nest of coil springs indicated as a whole by the numeral 5 being interposed between the underside of the bolster and the spring plank 6 which is likewise mounted within the window opening. Spring nests such as that referred to at 5 generally comprise four or more helical springs 7 symmetrically grouped and arranged between spring caps 8 and 9. Ordinarily such caps may be duplicates but in the present instance some modification is necessary to carry out the invention. The caps are represented as having punched-out bosses 10 fitting within the ends of the springs for retaining them in proper position and preventing displacement.

In carrying out the invention I provide an auxiliary spring means within the side frame beneath the window opening therein so that it will cooperate with the bottom cap of the spring nest and operate in series with the truck springs. The side frame is of ordinary type and, as is well known, has a depending truss portion 11 which is hollow. I propose to enclose the auxiliary spring means, which may be a coil 12, within this hollow portion of the side frame and it therefore becomes necessary to provide registering openings 13 and 14 in the side frame and spring plank, respectively, for the accommodation of the auxiliary spring so that the upper end thereof will project through and engage against the underside of the bottom cap 8. For properly centering the auxiliary spring it is preferable that the bottom cap 8 be formed centrally with an out-punched downwardly extending boss 15, or some other equivalent means, entering the upper end of the spring. One auxiliary spring 12 may be used and arranged centrally as shown in Figures 1 and 2, or a plurality, indicated at 16 in Figure 3, may be provided suitably symmetrically arranged with respect to the springs in the nest, there being no special limitation in this respect.

In Figure 4 I have shown a slight modification illustrating a structure wherein the spring plank 17 is not riveted to the side frame, as in Figure 1, but is formed near its end with a downwardly punched boss 18 fitting within an opening 19 in the seat portion of the side frame, this boss cooperating with the wall of the opening or openings corresponding to the opening 13 in Figure 1, this cooperation preventing shifting of the spring plank with respect to the side frames. The auxiliary spring means 12 of Figure 1 or 16 of Figure 3 would of course be accommodated in the hollow truss portion of the side frame in exactly the same manner as in Figure 1 as this auxiliary means would extend through the boss 18 for cooperation with the truck spring nest.

In both forms of the invention the auxiliary spring or springs will be compressed under the light car until the spring caps on the nests of truck springs engage upon the spring plank and against the bolster. In this position or under these conditions the static load on the auxiliary spring or springs is slightly less than the light weight of the car on the truck springs. The load on the auxiliary spring or springs should compress them an appreciable amount, say one inch, to compensate and maintain the side bearing elements, not shown, in contact with the coacting depending bearing elements on the body bolster as there is a tendency for these surfaces to move out of contact. The invention is therefore well adapted for use in installations where there are side bearing rollers or rockers on the truck bolster cooperating with depending bearing elements on the body bolster, the parts being arranged to permit lateral motion of the body bolster with respect to the truck. In this respect the general features and principles involved in the present application are similar to what is embodied in the co-pending application of Percy R. Drenning, filed November 12th, 1927, Serial No. 232,859 wherein are disclosed auxiliary springs located within the truck bolster and cooperating with the spring caps. At the normal spring load the travel should not put the spring solid and therefore the stress can be kept reasonably low. As the working of the auxiliary springs is infrequent their life should be indefinite. In case the auxiliary springs are provided in an installation of the rigid type or where the load is sustained on the center bearings with a nominal clearance at the side bearings, the action will be substantially the same as the auxiliary springs will operate to act against any tendency of the wheels to unload at one side or the other of the truck as for example when the car enters upon or leaves curved track, or develops, from any cause, a violent tendency to rock. In such an instance the auxiliary springs will act substantially as additional dead weight applied to the light side.

In addition to the foregoing advantages it may be pointed out that as the auxiliary springs are preferably lighter than the truck springs they will act more quickly and will be capable of taking up small shocks and jars or "jiggle" incident to car travel. It may also be mentioned that the auxiliary springs can be compressed to only a limited extent governed by the engagement of the top or bottom spring caps with the underside of the bolster and the spring plank respectively. A solid condition with resultant excessive fiber and other strains will be consequently avoided. Moreover it is conceivable that under some circumstances the difference in the period of vibration of the truck and auxiliary springs will break up synchronism and assist in preventing the development of car roll or side sway. From the foregoing it is believed that the construction, operation and advantages will be readily apparent to one skilled in the art without further explanation.

While I have shown and described preferred embodiments of the invention, it should be understood that the disclosure is merely an exemplification of the principles involved as the right is reserved to make all such changes in the details of construction as will widen the field of utilty and increase the adaptability of the device provided such changes constitute no departure from the spirit of the invention or the scope of the claims hereunto appended.

Having thus described the invention, I claim:

1. In a railway car truck, a side frame having a seat for truck springs and formed beneath said seat with a hollow portion containing auxiliary helical spring means adapted to cooperate with the truck springs and in series therewith, said auxiliary spring means serving to center the truck springs.

2. In a railway car truck, a side frame having a window opening therein, truck springs within the window opening, a truck bolster having its end supported upon said truck springs, the side frame having a hollow depending truss portion beneath the seat and having its seat formed with an opening leading into the hollow truss portion, and an auxiliary helical spring located within said hollow portion and projecting through said opening to operate in series with the truck springs, and means whereby the auxiliary spring will retain the truck springs against lateral displacement in any direction.

3. In a railway car truck, a side frame having a window opening therein, a truck bolster having its end extending through the window opening, a nest of truck springs within the window opening for supporting the truck bolster, said nest of springs including top and bottom caps, an auxiliary spring confined within the side frame beneath and directly abuttingly engaging the bottom spring cap, and means on the bottom spring cap cooperating with the auxiliary spring to prevent lateral displacement of the nest.

4. In an railway car truck, a side frame having a window opening therein, a truck bolster having its end extending through the window opening, a nest of truck springs within the window opening for supporting the truck bolster, said nest of springs including top and bottom caps, an auxiliary spring mounted beneath the nest and acting in series therewith, the bottom spring cap having a depending boss engaged within the upper end of the auxiliary spring.

In testimony whereof I affix my signature.

MARK H. MARTIN.